United States Patent [19]

Kosowan

[11] Patent Number: 5,080,941
[45] Date of Patent: Jan. 14, 1992

[54] DISPLAY ORNAMENT

[76] Inventor: Robert J. Kosowan, R.R.#1, East Selkirk, Manitoba, Canada, R0E 0M0

[21] Appl. No.: 533,283

[22] Filed: Jun. 4, 1990

[51] Int. Cl.$^5$ ............................................. F16B 47/00
[52] U.S. Cl. ........................................ 428/31; 40/597; 116/DIG. 24; 248/206.2; 428/187
[58] Field of Search ............... 40/597; 116/DIG. 24; 428/7, 31, 187; 248/206.2

[56] References Cited

U.S. PATENT DOCUMENTS

| | | | |
|---|---|---|---|
| 1,232,120 | 7/1917 | Sutter, Jr. ............... | 116/DIG. 24 |
| 3,237,330 | 3/1966 | Dinstbir ................. | 428/31 X |
| 3,526,050 | 9/1970 | Weller .................... | 428/31 X |

Primary Examiner—Henry F. Epstein
Attorney, Agent, or Firm—Adrian D. Battison; Stanley G. Ade; Murray E. Thrift

[57] ABSTRACT

A display ornament for attachment for example to the window of an automobile includes a sheet of foam of the thickness of the order of ½ inch which is cut in the form of a circle or a football shape. The foam sheet is attached to a window by a suction cup of the type having a head on one side, a short shank and a frusto-conical suction member. The thickness of the foam cooperates with the suction cup member to countersink the suction cup within the body of the foam material so that when attached to the window the front surface of the foam material is drawn tight against the window surface. Both surfaces of the foam can carry a suitable logo for advertising or display purposes.

5 Claims, 1 Drawing Sheet

DISPLAY ORNAMENT

BACKGROUND OF THE INVENTION

This invention relates to a display ornament of a type which can be mounted upon a smooth surface for example, a window of a motor vehicle.

The use of suction cups to mount display items within the window of a motor vehicle is well known. In many cases the display item comprises a rigid plastic sheet with a plurality of suction cups attached through the rigid plastic sheet and attachable to the window surface to hold the sheet close to but spaced from the window surface. Generally it is necessary in order to hold the device parallel to the window surface to provide a number of the suction cups at spaced positions across the face of the device. This of course increases the cost and also interferes with the printed material on the front face which is intended to be exposed at the window surface.

SUMMARY OF THE INVENTION

It is one object of the present invention to provide an improved display ornament of this general type which enables the ornament to be attached simply using a single suction cup and tending to hold a front surface of the body on which the ornamental material is printed in contact with or very closely adjacent the window surface.

According to the invention, therefore, is provided a display ornament comprising a flat body formed from a layer of resilient foam material of substantially constant thickness so as to provide two opposed flat surfaces of the body, an ornamental printed logo on at least one of the flat faces, and a suction cup member for attachment of the body to a support surface, suction cup member comprising a substantially cone shaped resilient suction cup and an attachment member including a shaft attached to an apex of the suction cup member and a head on the end of the shaft remote from the suction cup member, the body having a hole formed therethrough, the shaft being inserted into the hole with the head on one side of the body and the cup member on the other side of the body, the length of the shaft being less than the thickness of the body such that the foam adjacent the suction cup member is deformed into a cone shape to receive the suction cup member therein.

The use of the foam material thus enables the suction cup to be buried within the foam material so that when attached to the inside of the window of a motor vehicle, the front face of the foam is brought up directly into contact with or substantially in contact with the glass first presenting the device visibly on the outside of the vehicle. At the same time the foam material is resistant to bending and limits the amount of twisting on the suction cup so that the whole of the device can be substantially held against the window using only a single suction cup either at the centre or at the top edge. Furthermore, the device is soft and resilient so that it is not dangerous if it becomes detached and it does not rattle.

Preferably the hole formed through the foam material is inclined so that there is a twisting action on the suction cup tending to pull the lower edge of the device into contact with the window and this is particularly helpful when the device is applied in the rear window which in many vehicles is inclined.

With the foregoing in view, and other advantages as will become apparent to those skilled in the art to which this invention relates as this specification proceeds, the invention is herein described by reference to the accompanying drawings forming a part hereof, which includes a description of the best mode known to the application and of the preferred typical embodiment of the principles of the present invention, in which:

Figure 1:
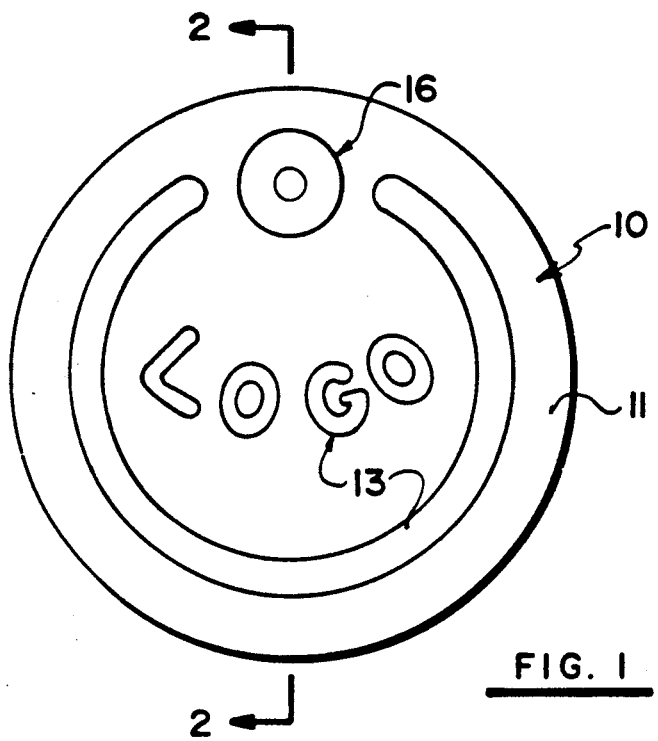
FIG. 1 is a front elevational view of a device according to the invention.

The device comprises simply a single flat sheet of foam material indicated at 10 including a front surface 11 and a rear surface 12 each of which carries printing 13 of a suitable attractive logo which is visible from the front and rear of the device.

The foam is a soft resilient foam of an open cell type and of constant thickness. A thickness of the order of 0.5 inches is preferred since this provides a device which is reasonably rigid that is it does not bend under its own weight and yet it can be attached to the suction cup as explained hereinafter. The outside shape of the device can be selected in accordance with the requirements of the manufacturer and can for example in relation to a hockey logo be circular to simulate a puck and in relation to a football logo can be football shaped.

The device further includes a suction cup of the type including a soft flexible suction cup portion and an attachment head. The suction cup portion is indicated at 16 and the head is indicated at 17 including a shaft 18 and mushroom shaped head portion 19.

Figures 2, 3, 4:
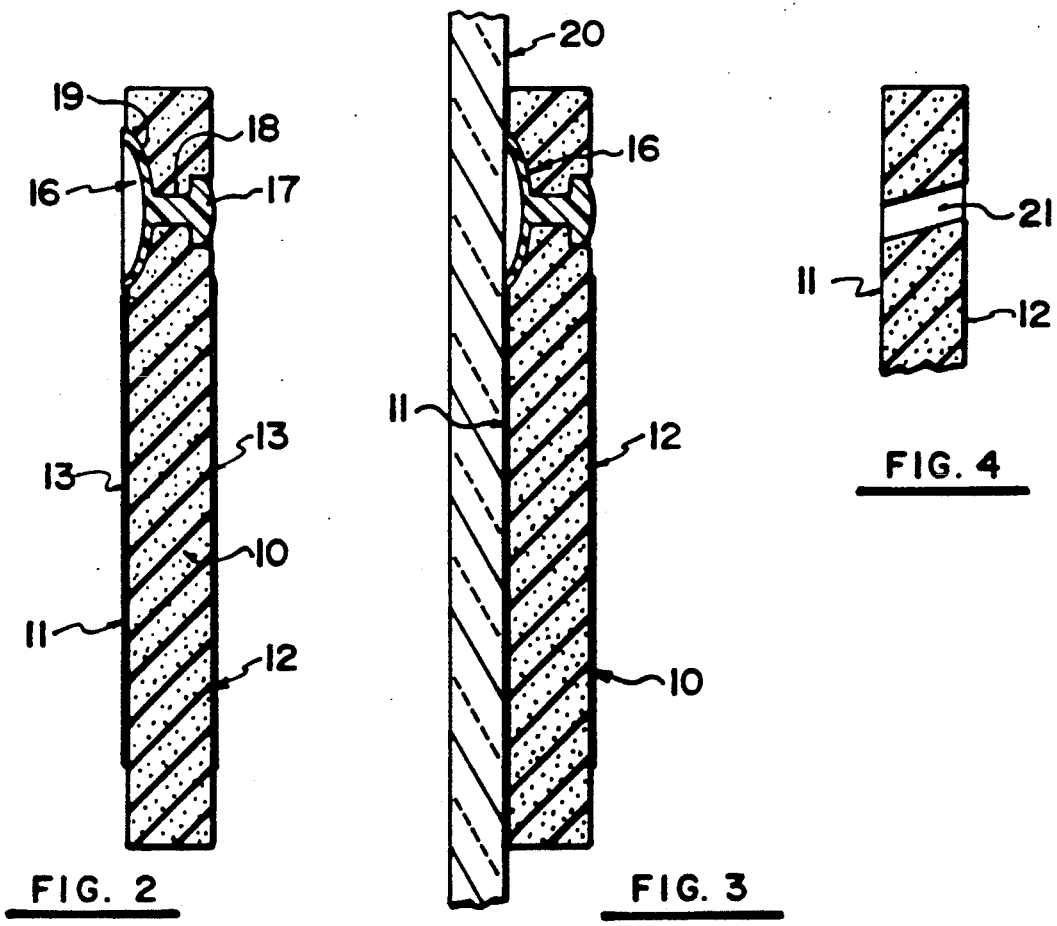
FIG. 2 is a cross sectional view along the lines 2—2 of FIG. 1.
FIG. 3 is a similar cross sectional view showing the device attached to a sheet of glass at a window for example, of a motor vehicle.
FIG. 4 is a cross sectional view similar to that of FIG. 2 showing a part only of the foam sheet with the suction cup removed.

As shown in FIG. 2, the thickness of the foam material is greater than the length of the shaft to an extent that the foam material can be received substantially on the shaft under compression with the head on one side of the foam material and the suction cup portion 16 on the other side of the foam material. As shown in FIG. 2 this tends to distort the foam material so that it takes up a conical shape similar to the rear conical surface 19 of the suction cup member 16. In this way the front lip of the suction cup member 16 lies substantially in the plane of the front surface of the foam material.

As shown in FIG. 3, when the suction cup portion 16 is distorted so as to attach to a glass sheet 20, this draws the front surface 11 of the foam material into contact with the glass sheet 20.

As shown in FIG. 4 the hole through the foam material indicated at 21 is inclined relative to a line at right angles to the surfaces 11 and 12 so the rear part of the opening of hole 21 is higher than the front portion as this tends to twist the suction cup member when it is inserted through the hole thus tending to force the lower part of the foam body forwardly into contact with the glass and this is particularly of value when the device is attached in the rear window of a vehicle which is inclined thus tending to cause the lower part of the foam body to hang away from the window.

The device thus presents the printed logo up firmly against the glass holding the logo in contact with or substantially closely adjacent the glass and thus allowing it to be presented visually outside of the vehicle. At the same time the printing on the rear side of the device enables the logo to be presented inside the vehicle.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A display ornament comprising a flat body formed from a layer of resilient foam material of substantially constant thickness so as to provide two opposed flat surfaces of the body, an ornamental printed logo on at least one of the flat faces, and a suction cup member for attachment of the body to a support surface, the suction cup member comprising a substantially cone shaped resilient suction cup and an attachment member including a shaft attached to an apex of the suction cup member and a head on the end of the shaft remote from the suction cup member, the body having a hole formed therethrough the shaft being inserted into the hole with the head on one side of the body and the cup member on the other side of the body, the length of the shaft being less than the thickness of the body such that the foam adjacent the suction cup member is deformed into a cone shape to receive the suction cup member therein.

2. The ornament according to claim 1 wherein the hole is formed such that it is inclined relative to a line at right angles to the surfaces of the body such that an end of the hole adjacent the head is higher than the end of the hole adjacent the suction cup member.

3. The ornament according to claim 1 wherein the suction member is transparent.

4. The ornament according to claim 1 wherein the thickness of the foam material is of the order of 0.5 inches.

5. The ornament according to claim 1 wherein both flat faces of the body have an ornamental printed logo thereon.

* * * * *